United States Patent
Coutin et al.

(10) Patent No.: US 11,628,939 B2
(45) Date of Patent: Apr. 18, 2023

(54) FRESH AIR ECS

(71) Applicant: Hamilton Sundstrand Corporation, Charlotte, NC (US)

(72) Inventors: Aiden Coutin, Enfield, CT (US); Tony Ho, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 140 days.

(21) Appl. No.: 17/203,285

(22) Filed: Mar. 16, 2021

(65) Prior Publication Data
US 2021/0291990 A1 Sep. 23, 2021

Related U.S. Application Data

(60) Provisional application No. 62/990,740, filed on Mar. 17, 2020.

(51) Int. Cl.
*B64D 13/00* (2006.01)
*B64D 13/06* (2006.01)

(52) U.S. Cl.
CPC ...... *B64D 13/06* (2013.01); *B64D 2013/0618* (2013.01); *B64D 2013/0648* (2013.01); *B64D 2013/0662* (2013.01)

(58) Field of Classification Search
CPC ............ B64D 13/06; B64D 2013/0618; B64D 2013/0648; B64D 2013/0662; B64D 2013/0603; B64D 2013/0644; B64D 2013/0688; Y02T 50/50
See application file for complete search history.

(56) References Cited

U.S. PATENT DOCUMENTS

| | | | |
|---|---|---|---|
| 10,160,547 B2* | 12/2018 | Bruno | F02C 6/08 |
| 10,457,399 B2 | 10/2019 | Bammann et al. | |
| 2003/0051500 A1* | 3/2003 | Asfia | B64D 13/06 62/402 |
| 2016/0083100 A1* | 3/2016 | Bammann | B64D 13/06 62/89 |
| 2017/0129614 A1* | 5/2017 | Bammann | F25B 9/004 |
| 2017/0341770 A1 | 11/2017 | Hiller | |
| 2018/0215474 A1 | 8/2018 | Defrancesco et al. | |
| 2019/0009912 A1* | 1/2019 | Matsui | B64D 13/02 |

FOREIGN PATENT DOCUMENTS

| | | |
|---|---|---|
| EP | 1293426 A2 | 3/2003 |
| EP | 3450319 B1 | 2/2020 |

OTHER PUBLICATIONS

Extended European Search Report; European Application No. 21162747.6-1010; dated Aug. 10, 2021; 11 pages.

* cited by examiner

*Primary Examiner* — Jacob M Amick
*Assistant Examiner* — Sherman D Manley
(74) *Attorney, Agent, or Firm* — Cantor Colburn LLP

(57) ABSTRACT

An environmental control system of a vehicle includes a ram air circuit including a ram air shell having a ram air heat exchanger positioned therein, a dehumidification system arranged in fluid communication with the ram air circuit, a first compression device arranged in fluid communication with the dehumidification system, the first compression device including a first compressor, and a second compression device arranged in fluid communication with the ram air circuit. The second compression device includes a second compressor. A first medium is provided to the first compressor and to the second compressor in series.

19 Claims, 1 Drawing Sheet

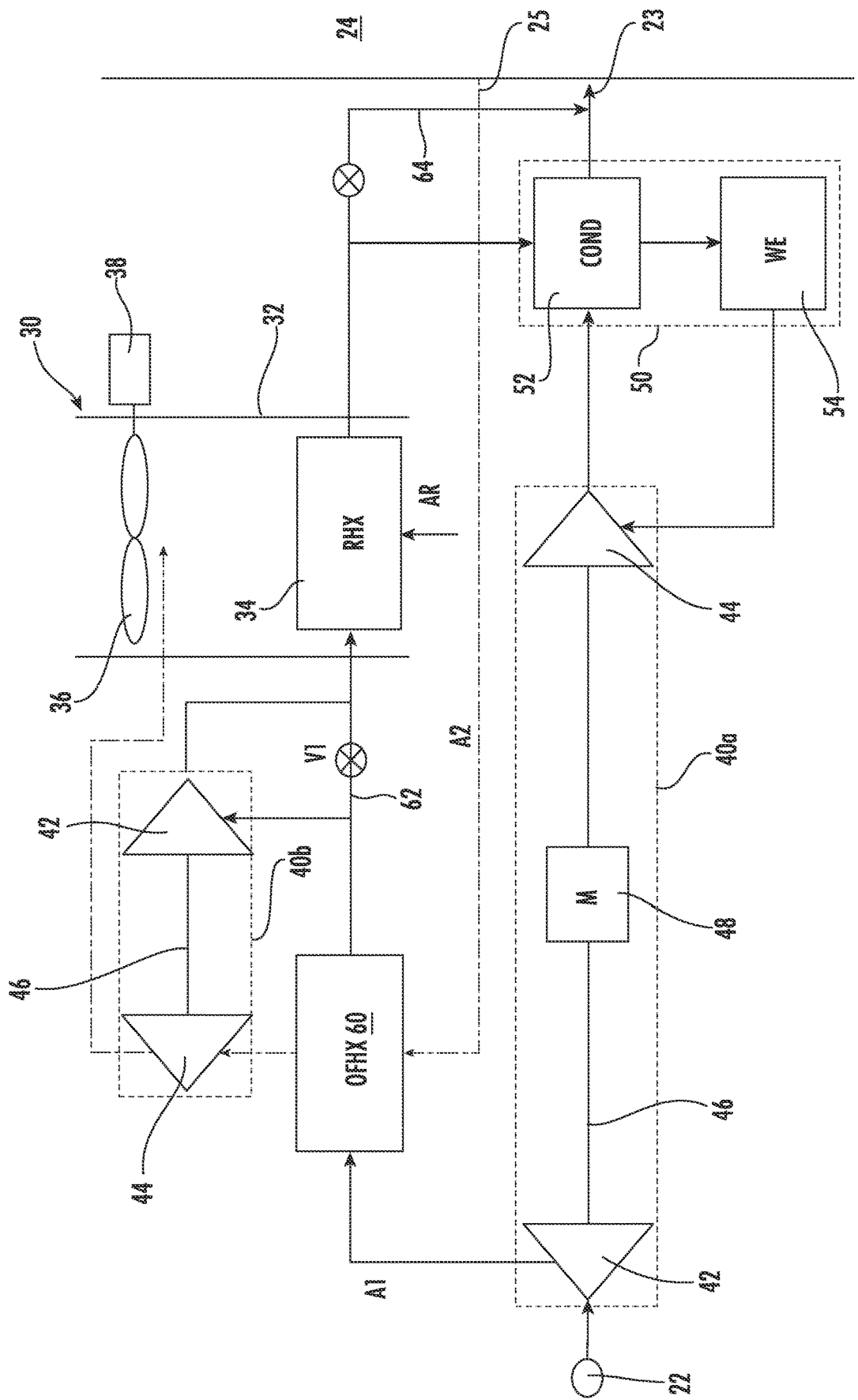

FRESH AIR ECS

CROSS-REFERENCE TO RELATED APPLICATIONS

This application claims the benefit of U.S. Provisional Application 62/990,740 filed Mar. 17, 2020, the disclosure of which is incorporated herein by reference in its entirety.

BACKGROUND

Embodiments of the disclosure relate to environmental control systems, and more specifically to an environmental control system of an aircraft.

Aircraft need to have their internal environment controlled. In general, contemporary air conditioning systems are supplied a pressure at cruise that is approximately 30 psig to 35 psig. The trend in the aerospace industry today is towards smaller systems with higher efficiency. One approach to improve efficiency of an aircraft environmental control system is to eliminate the bleed air entirely and use electrical power to compress outside air. A second approach is to use lower engine pressure. The third approach is to use the energy in the cabin outflow air to compress outside air and bring it into the cabin. Each of these approaches alone provides limited efficiency with respect to engine fuel burn.

BRIEF DESCRIPTION

According to one or more embodiments, an environmental control system of a vehicle includes a ram air circuit including a ram air shell having a ram air heat exchanger positioned therein, a dehumidification system arranged in fluid communication with the ram air circuit, a first compression device arranged in fluid communication with the dehumidification system, the first compression device including a first compressor, and a second compression device arranged in fluid communication with the ram air circuit. The second compression device includes a second compressor. A first medium is provided to the first compressor and to the second compressor in series.

In addition to one or more of the features described above, or as an alternative, in further embodiments the environmental control system includes an inlet and an outlet, and the first medium provided to the outlet has at least one of a temperature and pressure different from the first medium provided to the inlet.

In addition to one or more of the features described above, or as an alternative, in further embodiments the first medium is ambient air from outside the vehicle.

In addition to one or more of the features described above, or as an alternative, in further embodiments the second compression device further comprises a turbine operably coupled to the second compressor via a shaft, and a second medium provided to the turbine is configured to drive the second compressor.

In addition to one or more of the features described above, or as an alternative, in further embodiments a heat exchanger is arranged upstream from the turbine relative to a flow of the second medium, wherein heat is transferred to the second medium within the heat exchanger.

In addition to one or more of the features described above, or as an alternative, in further embodiments the second medium is provided from a source on board the vehicle.

In addition to one or more of the features described above, or as an alternative, in further embodiments the second medium is cabin outflow air.

In addition to one or more of the features described above, or as an alternative, in further embodiments the first compression device further comprises: a motor operably coupled to the first compressor, the motor being selectively operable to drive the first compressor and a second turbine coupled to the first compressor, the second turbine being selectively operable to drive the first compressor.

In addition to one or more of the features described above, or as an alternative, in further embodiments the environmental control system is operable in a plurality of modes based on a flight condition of the vehicle.

In addition to one or more of the features described above, or as an alternative, in further embodiments the plurality of modes includes a first mode and a second mode and during at least one of the first mode and the second mode, the motor is operable to drive the first compressor.

In addition to one or more of the features described above, or as an alternative, in further embodiments during the first mode, both the motor and the second turbine are operable in combination to drive the first compressor.

In addition to one or more of the features described above, or as an alternative, in further embodiments the environmental control system is operable in the first mode when the vehicle is in a first operating condition.

In addition to one or more of the features described above, or as an alternative, in further embodiments during the second mode, only the motor is operable to drive the first compressor.

In addition to one or more of the features described above, or as an alternative, in further embodiments the environmental control system is operable in the second mode when the vehicle is in a second operating condition.

According to another embodiment, a method of operating an environmental control system of a vehicle includes supplying a first medium to a first inlet, adjusting a temperature and a pressure of the first medium within a first compressor, further adjusting the temperature and the pressure of the first medium within a second compressor, the second compressor being arranged downstream from and in series with the first compressor, and delivering a conditioned form of the first medium to one or more loads of the vehicle via an outlet.

In addition to one or more of the features described above, or as an alternative, in further embodiments comprising driving said first compressor using at least one of a motor and energy extracted from a first turbine, the first turbine and the motor being operably coupled to the first compressor.

In addition to one or more of the features described above, or as an alternative, in further embodiments comprising driving the second compressor using at least one of a motor and energy extracted from a second medium in a second turbine operably coupled to the second compressor.

In addition to one or more of the features described above, or as an alternative, in further embodiments comprising heating the second medium directly upstream from the second turbine.

In addition to one or more of the features described above, or as an alternative, in further embodiments comprising at least one of exhausting the second medium from the second turbine overboard and exhausting the second medium from the second turbine into a ram air circuit.

In addition to one or more of the features described above, or as an alternative, in further embodiments the first medium is fresh air.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWING

The following descriptions should not be considered limiting in any way. With reference to the accompanying FIGURE, like elements are numbered alike:

The FIGURE is a simplified schematic diagram of a system according to an embodiment.

DETAILED DESCRIPTION

A detailed description of one or more embodiments of the disclosed apparatus and method are presented herein by way of exemplification and not limitation with reference to the FIGURE.

Embodiments herein provide an environmental control system of an aircraft that mixes mediums from different sources and uses energy from one or more of the different sources to power the environmental control system and to provide cabin pressurization and cooling at a high fuel burn efficiency. The mediums described herein are generally types of air; however, it should be understood that other mediums, such as gases, liquids, fluidized solids, or slurries are also contemplated herein.

With reference now to the FIGURE, a schematic diagram of a portion of an environment control system (ECS) 20, such as a pack for example, is depicted according to non-limiting embodiments. Although the environmental control system 20 is described with reference to an aircraft, alternative applications are also within the scope of the disclosure. As shown in the FIGURE, the system 20 can receive a first medium A1 at an inlet 22. In embodiments where the environmental control system 20 is used in an aircraft application, the first medium A1 is fresh air, such as outside air for example. The outside air can be procured via one or more scooping mechanisms, such as an impact scoop or a flush scoop for example. Thus, the inlet 22 can be considered a fresh or outside air inlet. Generally, the fresh air A1 described herein is at an ambient pressure equal to an air pressure outside of the aircraft when the aircraft is on the ground, and is between an ambient pressure and a cabin pressure when the aircraft is in flight. In an embodiment, a conditioned form of the first medium A1 is output from the environmental control system to a volume 24.

The system 20 can further receive a second medium A2 from the volume 24, such as via inlet 25. In one embodiment, the volume 24 is the cabin of an aircraft and the second medium A2 is cabin discharge or outflow air, which is air leaving the volume 24 that would typically be discharged overboard. In an embodiment, the system 20 is configured to extract work from the second medium A2. In this manner, the pressurized air A2 of the volume 24 can be utilized by the system 20 to achieve certain operations.

The environmental control system 20 includes a ram air circuit 30 including a shell or duct, illustrated schematically at 32, within which one or more heat exchangers are located. The shell 32 can receive and direct a medium, such as ram air AR for example, through a portion of the system 20. The one or more heat exchangers 34 arranged within the shell 32 may be referred to as ram heat exchangers and are built for efficient heat transfer from one medium to another. Within the one or more heat exchangers 34, ram air AR, such as outside air for example, acts as a heat sink to cool a medium passing there through, for example the first medium A1. Examples of the type of heat exchangers that may be used, include, but are not limited to, double pipe, shell and tube, plate, plate and shell, adiabatic shell, plate fin, pillow plate, and fluid heat exchangers. As shown, a fan 36 is disposed within the ram air shell 32. The fan 36 is operable to force via push or pull methods a medium (e.g., ram air) through the shell 32 across the one or more ram heat exchangers 34.

The system 20 additionally comprises at least one compression device. The at least one compression device 40 of the system 20 is a mechanical device that includes components for performing thermodynamic work on a medium (e.g., extracts work from or applies work to the first medium A1, the second medium A2, by raising and/or lowering pressure and by raising and/or lowering temperature). Examples of the compression device 40 include an air cycle machine, a three-wheel air cycle machine, a four-wheel air cycle machine, etc. In the illustrated, non-limiting embodiment, the at least one compression device includes a first compression device 40a and a second compression device 40b, located remotely from the first compression device 40a. However, embodiments including a single compression device or more than two compression devices are also within the scope of the disclosure.

As shown, each of the one or more compression devices 40a, 40b includes a compressor 42 and a turbine 44 operably coupled to each other via a shaft 46. The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the first medium. The turbine 44 are mechanical devices that expand a medium and extract work therefrom (also referred to as extracting energy). The turbine 44 may comprise a nozzle configured to accelerate a medium supplied thereto for entry into a turbine impeller (not shown). In the compression device 40, the turbine 44 is configured to drive the compressor 42 via the shaft 46.

In the illustrated, non-limiting embodiment, in addition to the compressor 42 and the turbine 44, the first compression device 40a additionally includes a motor 48 operably coupled to the compressor 42 via the shaft 46. In such embodiments, the compressor 42 receives the first medium A1 and using power provided from one or both of the motor 48 and turbine 44 compresses the first medium A1.

The system 20 additionally includes at least one dehumidification system 50. In the illustrated, non-limiting embodiment, the dehumidification system 50 includes a condenser 52 and a water extractor 54. The condenser 52 is a particular type of heat exchanger and the water extractor 54 is a mechanical device that performs a process of removing water from a medium. Although not shown, in other embodiments, the dehumidification system may further include a reheater heat exchanger. The reheater may be arranged directly upstream from the condenser 52, or alternatively, may be arranged at another location within the dehumidification system. In an embodiment, water collected from the water extractor 54 may be sprayed into the ram air circuit or entrained with the ram air AR to depress the inlet temperature and gain more effective heat transfer.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value.

The system 20 is operable in a plurality of modes, selectable based on a flight condition of the aircraft. In an embodiment, the system 20 is operable in a first mode when the aircraft is on the ground and in a second mode when the aircraft is in flight, such as high altitude cruise, climb, and/or descent for example.

During operation in the first mode, the first medium A1 enters the ECS 20 at the inlet 22. In the illustrated, non-limiting embodiment, the first medium A1 is provided from the inlet 22 directly to the compressor 42 of the first compression device 40*a*. However, it should be understood that embodiments including one or more components, such as a heat exchanger for example, arranged upstream from the compressor 42 are also within the scope of the disclosure. Within the compressor 42, the first medium A1 is compressed causing the temperature and the pressure of the first medium A1 to increase. The heated, pressurized first medium A1 output from the compressor 42 is then provided to a downstream outflow heat exchanger 60. In an embodiment, the outflow heat exchanger 60 utilizes the second medium A2, such as cabin discharge air sourced from the volume 24 for example, to cool the first medium A1.

From the outflow heat exchanger 60, the second medium A2 is provided to the turbine 44 of the second compression device 40*b*. In some embodiments, when the ECS 20 is operating in the first mode, such as when the aircraft is on the ground, the compressor bypass check valve is likely to be open or at least partially open. As a result, all or a portion of the first medium A1 output from the outflow heat exchanger 60 is configured to bypass the compressor 42 of the second compression device 40*b*, and is provided directly to the hot side of the ram air heat exchanger 34 within the ram air circuit 30. However, in other operations, such as in flight, flow from the first medium A1 output from the outflow heat exchanger 60 may be provided to the compressor 42 of the second compression device 40*b*. The heated second medium A2 is expanded across the turbine 44 and work is extracted therefrom. The work extracted by the turbine 44 of the second compression device 40*b* drives the compressor 42 of the second compression device 40*b* causing the temperature and the pressure of the first medium A1 within the compressor 42 to increase. The cooled, reduced pressure second medium A2 output from the turbine 44 of the second compression device 40*b* may be exhausted overboard, or alternatively, may be dumped into the ram air circuit 30. In embodiments where the second medium A2 is provided to the ram air circuit 30, this additional air may be used to supplement the cooling performed by the ram air circuit 30. However, although the second medium A2 is illustrated as being arranged downstream of the heat exchanger 34, embodiments where the second medium is arranged in a heat transfer relationship with the one or more heat exchanger 34 are also contemplated herein.

The heated pressurized first medium A1 output from the compressor 42 of the second compression device 40*b* or the bypass conduit 62 is provided to a ram heat exchanger 34. As shown, the fan 36 is used to move air, such as ram air for example, through or across the ram air heat exchanger. In the illustrated, non-limiting embodiment, the fan 36 is an electric ram fan driven by an electric motor 38. However, in other embodiments, the fan 36 may be part of one of the compression devices, such as operably coupled to the turbine 44 of the second compression device 40*b* via the shaft 56 for example, or as its own piece of rotating machinery such as a tip turbine fan. The compressed first medium A1 output from the ram air heat exchanger 34 is provided to the condenser 52 and then to the water extractor 54 of the dehumidification system 50 to condense and remove moisture therefrom.

From the water extractor 54, the warm, dry first medium A1 is provided to an inlet of the turbine 44 of the first compression device 40*a*. The first medium A1 is expanded across the turbine 44 and work is extracted therefrom. The work extracted by the turbine 44 of the first compression device 40*a* is used to drive the compressor 42 of the first compression device 40*a* via the shaft 46. However, in the first mode of operation, the motor 48 is used in combination with the turbine 44 to drive the compressor 42 of the first compression device 40*a* at a necessary speed to achieve a first medium A1 having a desired pressure and temperature at the outlet 23 of the ECS 20. In an embodiment, the motor 48 is operable to drive the compressor 42 of the first compression device 40*a* to achieve greater pressurization therein than the pressurization achievable within the compressor 42 of the second compression device 40*b*, driven by the energy extracted from the second medium A2. The further cooled, reduced pressure first medium A1 output from the turbine 44 of the first compression device 40*a* is then provided to the condenser 52, where the first medium A1 is heated prior to being delivered to one or more loads of the aircraft, such as the volume 24 for example, via the outlet 23.

Operation of the ECS 20 in a second mode of operation, such as when the aircraft is in flight, is similar to operation in the first mode. However, during operation in the second mode, the compressor 42 of the first compression device 40*a* is driven solely via the motor 48. As previously described, the first medium A1 is pressurized and heated within the compressor 42 of the first compression device 40*a*, is partially cooled within the outflow heat exchanger 60, and is further pressurized and heated within the compressor 42 of the second compression device 40*b* before being supplied to the ram air heat exchanger 34. After making one or more passes through the ram air heat exchanger, the first medium is configured to flow through a bypass conduit 64, and bypass the remainder of the ECS. In the second mode of operation, the valve V2 is open, thereby allowing the first medium A1 to flow into the bypass conduit. The outlet of the bypass conduit 64 is arranged directly upstream from the outlet 23 of the ECS. Accordingly, within the compressor 42 of the second compression device 40*b*, the first medium A1 is pressurized to a desired pressure associated with one or more loads of the aircraft to be supplied by the ECS 20 and within the ram air heat exchanger 34, the first medium A1 is cooled to a desired temperature associated with the one or more loads of the aircraft to be supplied by the ECS 20.

In both the first and second modes of operation, the first medium A1 to be supplied to one or more loads of the aircraft, such as the cabin or volume 24 for example, is supplied to a plurality of compressors 42 in series. In addition, in both modes of operation, the second medium A2 is heated, such as via a heat exchange relationship with the first medium A1, to increase and/or maximize the compression of the first medium A1 performed in the compressor 42 of the second compression device A2.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An environmental control system of a vehicle comprising:
   a ram air circuit including a ram air shell having a ram air heat exchanger positioned therein;
   a dehumidification system arranged in fluid communication with the ram air circuit;
   a first compression device arranged in fluid communication with the
   dehumidification system, the first compression device including a first compressor; and
   a second compression device arranged in fluid communication with the ram air circuit, the second compression device including a second compressor and a turbine, wherein a first medium is provided to the first compressor and to the second compressor in series, and energy is extracted from a second medium within the turbine to drive the second compressor; and
   a heat exchanger configured to receive a flow of both the first medium and the second medium, wherein an outlet of the heat exchanger is fluidly connected to the turbine such that the flow of second medium is provided to the heat exchanger and the turbine in series, wherein the second medium is heated within the heat exchanger.

2. The environmental control system of claim 1, wherein the environmental control system includes an inlet and an outlet, and the first medium provided to the outlet has at least one of a temperature and pressure different from the first medium provided to the inlet.

3. The environmental control system of claim 1, wherein the first medium is ambient air from outside the vehicle.

4. The environmental control system of claim 1, wherein the turbine is operably coupled to the second compressor via a shaft.

5. The environmental control system of claim 4, wherein the second medium is provided from a source on board the vehicle.

6. The environmental control system of claim 4, wherein the second medium is cabin outflow air.

7. The environmental control system of claim 1, wherein the first compression device further comprises:
   a motor operably coupled to the first compressor, the motor being selectively operable to drive the first compressor; and
   a second turbine coupled to the first compressor, the second turbine being selectively operable to drive the first compressor.

8. The environmental control system of claim 7, wherein the environmental control system is operable in a plurality of modes based on a flight condition of the vehicle.

9. The environmental control system of claim 8, wherein the plurality of modes includes a first mode and a second mode and during at least one of the first mode and the second mode, the motor is operable to drive the first compressor.

10. The environmental control system of claim 9, wherein during the first mode, both the motor and the second turbine are operable in combination to drive the first compressor.

11. The environmental control system of claim 9, wherein the environmental control system is operable in the first mode when the vehicle is in a first operating state.

12. The environmental control system of claim 9, wherein during the second mode, only the motor is operable to drive the first compressor.

13. The environmental control system of claim 12, wherein the environmental control system is operable in the second mode when the vehicle is in a second operating state.

14. A method of operating an environmental control system of a vehicle comprising:
   supplying a first medium to a first inlet;
   adjusting a temperature and a pressure of the first medium within a first compressor of a first compression device;
   further adjusting the temperature and the pressure of the first medium within a second compressor of a second compression device, the second compression device including a turbine, wherein the second compressor being arranged downstream from and in series with the first compressor;
   extracting energy from a second medium within the turbine to drive the second compressor;
   heating a second medium within a heat exchanger, the heat exchanger being arranged upstream from the second compression device relative to a flow of both the first medium and the second medium, wherein the second medium is provided to the heat exchanger and the second compression device in series; and
   delivering a conditioned form of the first medium to one or more loads of the vehicle via an outlet.

15. The method of claim 14, further comprising driving said first compressor using at least one of a motor and energy extracted from a first turbine, the first turbine and the motor being operably coupled to the first compressor.

16. The method of claim 14, further comprising driving the second compressor using a motor.

17. The method of claim 16, wherein the heat exchanger is directly upstream from the second turbine.

18. The method of claim 16, further comprising at least one of exhausting the second medium from the second turbine overboard and exhausting the second medium from the second turbine into a ram air circuit.

19. The method of claim 14, wherein the first medium is fresh air.

* * * * *